United States Patent
Ouyang et al.

(10) Patent No.: US 9,645,922 B2
(45) Date of Patent: May 9, 2017

(54) GARBAGE COLLECTION IN SSD DRIVES

(71) Applicant: HoneycombData Inc., Santa Clara, CA (US)

(72) Inventors: Xiangyong Ouyang, South San Francisco, CA (US); Jongman Yoon, San Jose, CA (US); Sushma Devendrappa, San Jose, CA (US)

(73) Assignee: HONEYCOMBDATA INC., Santa Clara, CA (US)

( * ) Notice: Subject to any disclaimer, the term of this patent is extended or adjusted under 35 U.S.C. 154(b) by 54 days.

(21) Appl. No.: 14/850,447

(22) Filed: Sep. 10, 2015

(65) Prior Publication Data
US 2017/0075805 A1    Mar. 16, 2017

(51) Int. Cl.
*G06F 12/00* (2006.01)
*G06F 12/02* (2006.01)

(52) U.S. Cl.
CPC .. *G06F 12/0246* (2013.01); *G06F 2212/1036* (2013.01); *G06F 2212/214* (2013.01); *G06F 2212/7205* (2013.01); *G06F 2212/7211* (2013.01)

(58) Field of Classification Search
None
See application file for complete search history.

(56) References Cited

U.S. PATENT DOCUMENTS

| | | |
|---|---|---|
| 2009/0198947 A1 | 8/2009 | Khmelnitsky |
| 2011/0066789 A1 | 3/2011 | Wakrat |
| 2011/0138105 A1 | 6/2011 | Franceschini |
| 2012/0173795 A1 | 7/2012 | Schuette |
| 2013/0060991 A1 | 3/2013 | Lee |
| 2015/0026390 A1 | 1/2015 | Li |
| 2015/0026391 A1 | 1/2015 | Su |
| 2015/0161035 A1 | 6/2015 | Fisher |

FOREIGN PATENT DOCUMENTS

| | | |
|---|---|---|
| CN | 103150258 A | 6/2013 |
| CN | 103744615 A | 4/2014 |

*Primary Examiner* — Kevin Verbrugge
(74) *Attorney, Agent, or Firm* — David R. Stevens; Stevens Law Group

(57) ABSTRACT

A storage device, such as a NAND flash device, includes a controller that maintains a temperature for a plurality of data blocks, the temperature calculated according to a function that increases with a number of valid data objects in the block and recency with which the valid data objects have been accessed. Blocks with the lowest temperature are selected for garbage collection. Recency for a block is determined based on a number of valid data objects stored in the block that are referenced in a hot list of a LRU list. During garbage collection, data objects that are least recently used are invalidated to reduce write amplification.

20 Claims, 5 Drawing Sheets

GARBAGE COLLECTION IN SSD DRIVES

BACKGROUND

Field of the Invention

This invention relates to systems and methods for storing and accessing data in a flash memory system.

Background of the Invention

Solid-state drives, also referred to as SSDs, are data storage devices that make use of NAND flash memory devices as storage elements. Typically they have a SSD controller that accepts host commands on one end and communicate to the NAND flash on the other. NAND flash is a type of non-volatile storage device that retains data when powered off. The SSD controller accesses the NAND flash device through the NAND interface.

A NAND flash device includes a plurality of flash-blocks or blocks each divided into a plurality of pages. NAND flash has a fundamental limitation on write operations: a flash page has to be erased before write can happen and erasure has to be done in flash-block granularity. This characteristic makes necessary garbage collection (GC), an operation that reads a flash block, discard invalid data (garbage), preserves valid data by writing it to another fresh block, and erase the first block to prepare it for a new incoming write.

Garbage collection can consume a lot of read/write bandwidth and causes write amplification (WA), which reduces NAND flash lifespan. In a conventional NAND-based storage, data is always valid until being explicitly deleted. GC has to preserve all data that hasn't been deleted. An SSD vendor therefore has to perform Over Provision (OP), which preserves a portion of total storage capacity for GC usage. OP can reduce WA to a certain level, but at the cost of less useable space to users.

The apparatus and methods disclosed herein provide an improved approach for performing garbage collection in a NAND flash device.

BRIEF DESCRIPTION OF THE DRAWINGS

In order that the advantages of the invention will be readily understood, a more particular description of the invention briefly described above will be rendered by reference to specific embodiments illustrated in the appended drawings. Understanding that these drawings depict only typical embodiments of the invention and are not therefore to be considered limiting of its scope, the invention will be described and explained with additional specificity and detail through use of the accompanying drawings, in which.

DETAILED DESCRIPTION

Figure 1:
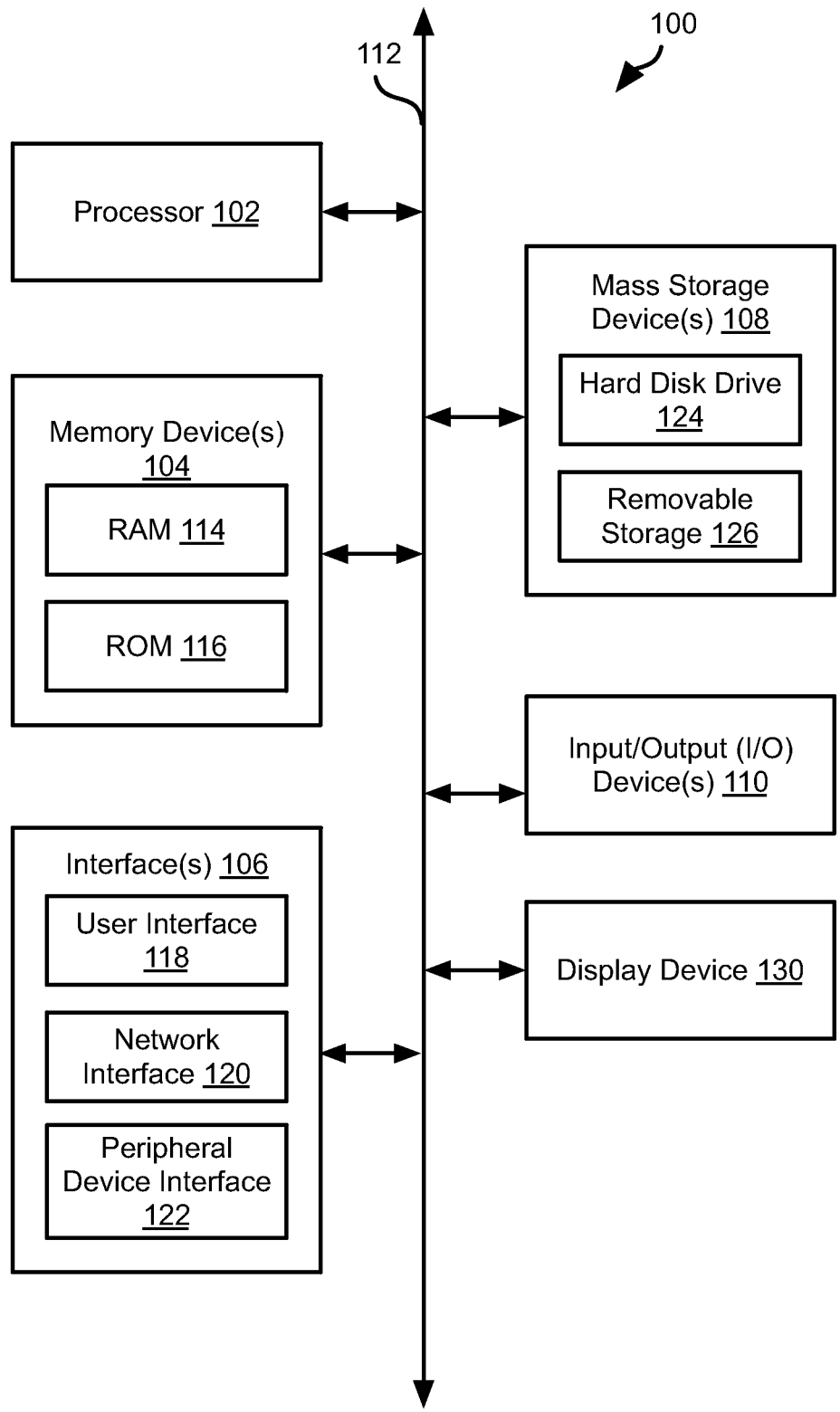
FIG. 1 is a schematic block diagram of a computing system suitable for implementing methods in accordance with embodiments of the invention.

It will be readily understood that the components of the present invention, as generally described and illustrated in the Figures herein, could be arranged and designed in a wide variety of different configurations. Thus, the following more detailed description of the embodiments of the invention, as represented in the Figures, is not intended to limit the scope of the invention, as claimed, but is merely representative of certain examples of presently contemplated embodiments in accordance with the invention. The presently described embodiments will be best understood by reference to the drawings, wherein like parts are designated by like numerals throughout.

The invention has been developed in response to the present state of the art and, in particular, in response to the problems and needs in the art that have not yet been fully solved by currently available apparatus and methods.

Embodiments in accordance with the present invention may be embodied as an apparatus, method, or computer program product. Accordingly, the present invention may take the form of an entirely hardware embodiment, an entirely software embodiment (including firmware, resident software, micro-code, etc.), or an embodiment combining software and hardware aspects that may all generally be referred to herein as a "module" or "system." Furthermore, the present invention may take the form of a computer program product embodied in any tangible medium of expression having computer-usable program code embodied in the medium.

Any combination of one or more computer-usable or computer-readable media may be utilized. For example, a computer-readable medium may include one or more of a portable computer diskette, a hard disk, a random access memory (RAM) device, a read-only memory (ROM) device, an erasable programmable read-only memory (EPROM or flash memory) device, a portable compact disc read-only memory (CDROM), an optical storage device, and a magnetic storage device. In selected embodiments, a computer-readable medium may comprise any non-transitory medium that can contain, store, communicate, propagate, or transport the program for use by or in connection with the instruction execution system, apparatus, or device.

Computer program code for carrying out operations of the present invention may be written in any combination of one or more programming languages, including an object-oriented programming language such as Java, Smalltalk, C++, or the like and conventional procedural programming languages, such as the "C" programming language or similar programming languages. The program code may execute entirely on a computer system as a stand-alone software package, on a stand-alone hardware unit, partly on a remote computer spaced some distance from the computer, or entirely on a remote computer or server. In the latter scenario, the remote computer may be connected to the computer through any type of network, including a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions or code. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a non-transitory computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

FIG. 1 is a block diagram illustrating an example computing device 100. Computing device 100 may be used to perform various procedures, such as those discussed herein. Computing device 100 can function as a server, a client, or any other computing entity. Computing device can perform various monitoring functions as discussed herein, and can execute one or more application programs, such as the application programs described herein. Computing device 100 can be any of a wide variety of computing devices, such as a desktop computer, a notebook computer, a server computer, a handheld computer, tablet computer and the like.

Computing device 100 includes one or more processor(s) 102, one or more memory device(s) 104, one or more interface(s) 106, one or more mass storage device(s) 108, one or more Input/Output (I/O) device(s) 110, and a display device 130 all of which are coupled to a bus 112. Processor(s) 102 include one or more processors or controllers that execute instructions stored in memory device(s) 104 and/or mass storage device(s) 108. Processor(s) 102 may also include various types of computer-readable media, such as cache memory.

Memory device(s) 104 include various computer-readable media, such as volatile memory (e.g., random access memory (RAM) 114) and/or nonvolatile memory (e.g., read-only memory (ROM) 116). memory device(s) 104 may also include rewritable ROM, such as flash memory.

Mass storage device(s) 108 include various computer readable media, such as magnetic tapes, magnetic disks, optical disks, solid-state memory (e.g., flash memory), and so forth. As shown in FIG. 1, a particular mass storage device is a hard disk drive 124. Various drives may also be included in mass storage device(s) 108 to enable reading from and/or writing to the various computer readable media. Mass storage device(s) 108 include removable media 126 and/or non-removable media.

I/O device(s) 110 include various devices that allow data and/or other information to be input to or retrieved from computing device 100. Example I/O device(s) 110 include cursor control devices, keyboards, keypads, microphones, monitors or other display devices, speakers, printers, network interface cards, modems, lenses, CCDs or other image capture devices, and the like.

Display device 130 includes any type of device capable of displaying information to one or more users of computing device 100. Examples of display device 130 include a monitor, display terminal, video projection device, and the like.

interface(s) 106 include various interfaces that allow computing device 100 to interact with other systems, devices, or computing environments. Example interface(s) 106 include any number of different network interfaces 120, such as interfaces to local area networks (LANs), wide area networks (WANs), wireless networks, and the Internet. Other interface(s) include user interface 118 and peripheral device interface 122. The interface(s) 106 may also include one or more user interface elements 118. The interface(s) 106 may also include one or more peripheral interfaces such as interfaces for printers, pointing devices (mice, track pad, etc.), keyboards, and the like.

Bus 112 allows processor(s) 102, memory device(s) 104, interface(s) 106, mass storage device(s) 108, and I/O device(s) 110 to communicate with one another, as well as other devices or components coupled to bus 112. Bus 112 represents one or more of several types of bus structures, such as a system bus, PCI bus, IEEE 1394 bus, USB bus, and so forth.

For purposes of illustration, programs and other executable program components are shown herein as discrete blocks, although it is understood that such programs and components may reside at various times in different storage components of computing device 100, and are executed by processor(s) 102. Alternatively, the systems and procedures described herein can be implemented in hardware, or a combination of hardware, software, and/or firmware. For example, one or more application specific integrated circuits (ASICs) can be programmed to carry out one or more of the systems and procedures described herein.

Figure 2:
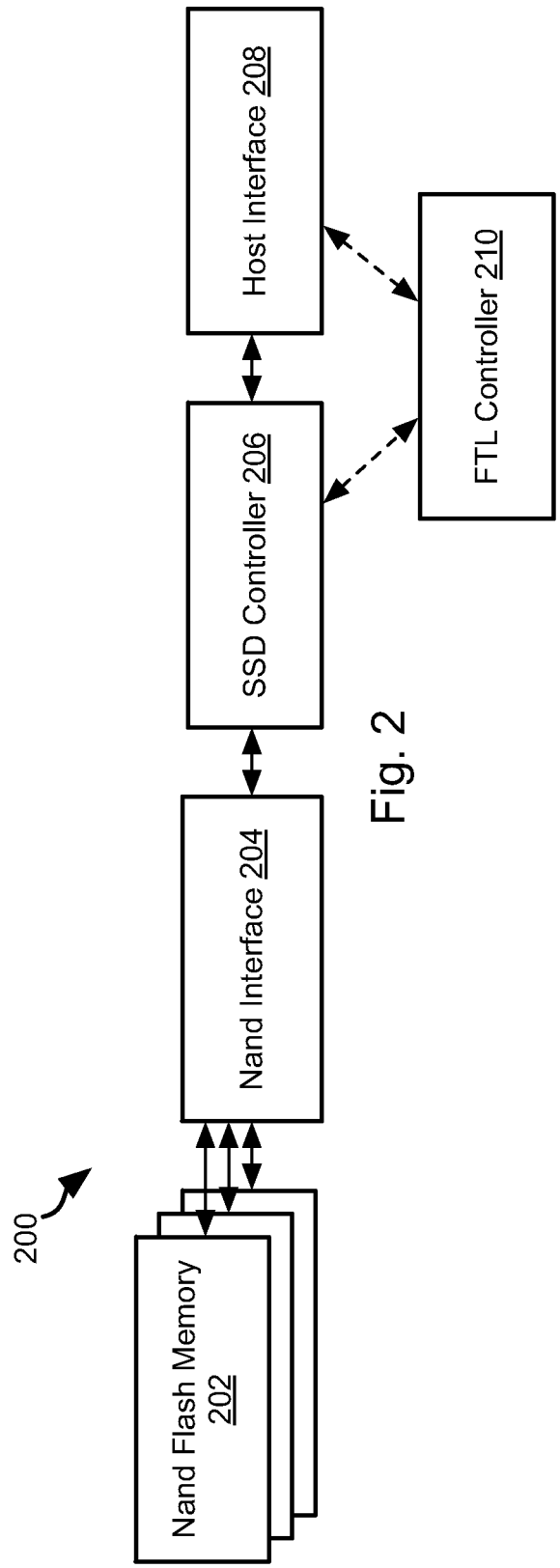
FIG. 2 is a schematic block diagram of a components of a storage system in accordance with the prior art.

Referring to FIG. 2, in some embodiments, a system 200 including a solid state drive (SSD) 200 may include a plurality of NAND flash memory devices 202. One or more NAND devices 202 may interface with a NAND interface 204 that interacts with an SSD controller 206. The SSD controller 206 may receive read and write instructions from a host interface 208 implemented on or for a host device, such as a device including some or all of the attributes of the computing device 100. The host interface 208 may be a data bus, memory controller, or other components of an input/output system of a computing device, such as the computing device 100 of FIG. 1.

The systems and methods disclosed herein may be implemented by an FTL (flash translation layer) controller 210. The FTL controller may be implemented by the SSD controller 206 or by the host interface 208 or other component or processing device of a host system coupled to the SSD controller 206.

Figure 3:
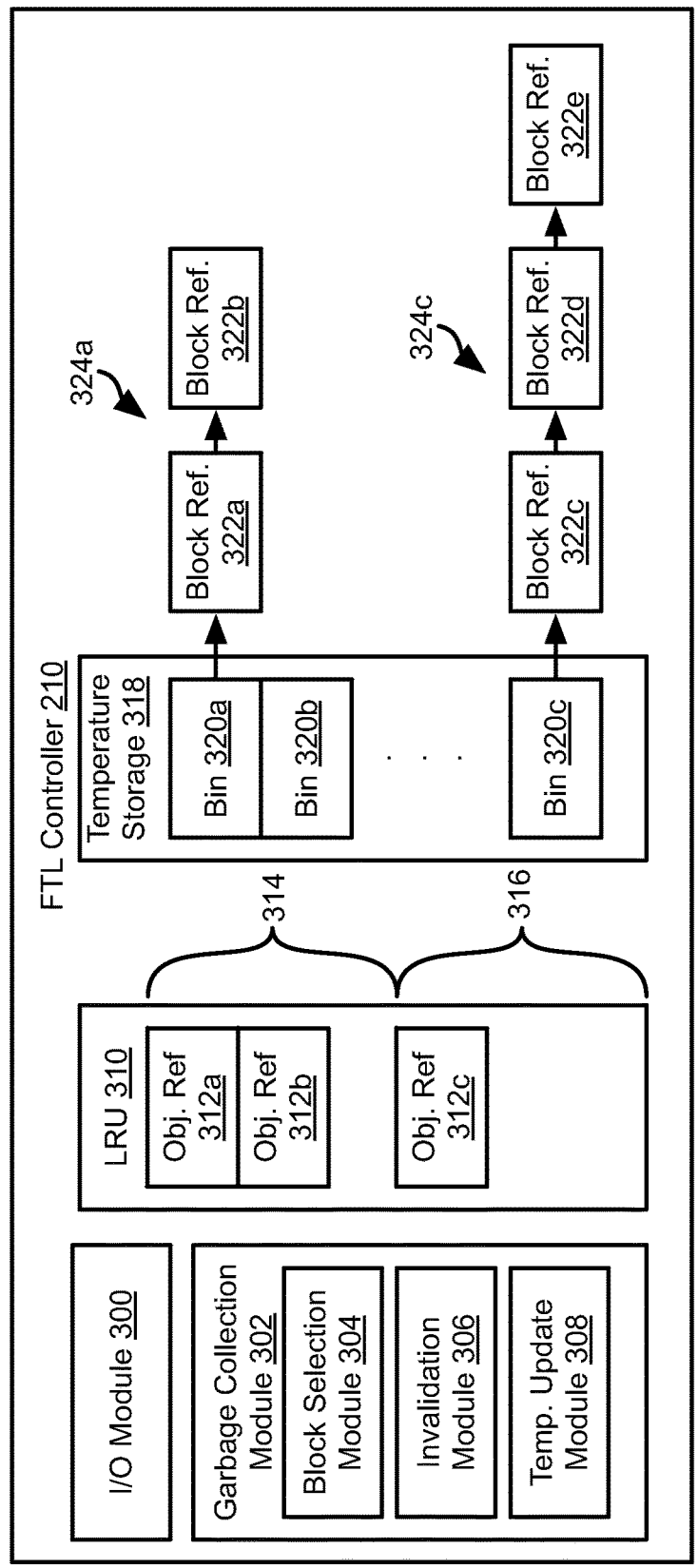
FIG. 3 is a schematic block diagram of components implementing garbage collection in accordance with an embodiment of the present invention.

Referring to FIG. 3, in the illustrated embodiment, an FTL controller 210 implements various modules and data structures.

The FTL controller 210 may include an input/output (I/O) module 300 that executes read and write instructions from a host interface 208. The I/O module 300 may execute these instructions in any manner known in the art. The I/O module 300 may invoke retrieval of data referenced in read requests from the NAND flash memory 202 and return it to the host interface 208. The I/O module 300 may invoke writing of data included in a write request to the NAND flash memory 202.

Read requests may reference data objects stored in the NAND flash memory 202. The NAND flash memory 202 may be divided into a plurality of blocks of memory that each represents a different chip of the NAND flash memory 202 or portion of a chip. Accordingly, a read request may reference both a block of the plurality of blocks of memory as well as a data object stored in that block. A data object may be a page or some other unit of memory such that each data object has an identical size.

The FTL controller 210 may implement a garbage collection module 302 that performs garbage collection to free up blocks of memory that include a large number of invalid data objects. The garbage collection module 302 may include a block selection module 304 that selects blocks for garbage collection according to the method disclosed herein. For example, the block selection module 304 may select blocks for garbage collection according to "temperatures" of the plurality of blocks of memory, such as according to the method 500 of FIG. 5 described hereinbelow.

The garbage collection module 302 may include an invalidation module 306. The invalidation module 306 proactively invalidates data objects during garbage collection to avoid the space required to store valid objects rewritten to a new location. The process of invalidating objects during garbage collection is also described below with respect to the method 500 of FIG. 5. Accordingly various "invalidation criteria" may be used to invalidate a data object: it may be invalidated due to being erased or proactively invalidated by the invalidation module 306 as described in detail herein.

The garbage collection module 302 may further include a temperature update module 308 that determines the temperature of blocks based on both of the number of valid objects stored therein and the recency with which the data objects thereof have been accessed. The method by which the temperature of a block is determined is described below with respect to the method 400 of FIG. 4.

The temperature of blocks may be calculated using a LRU list 310. The LRU list 310 lists data objects in a reverse order of when they were accessed. In particular, in response to each read request, an object reference 312a-312c may be added to the top most entry of the LRU list 310 and existing entries would then be displaced down the LRU list 310. Accordingly, in the illustrated example, the most recently executed read request references object reference 312a.

The LRU list 310 may be implemented as a circular buffer with a pointer indicating a location of the most recent entry, i.e. the top of the list. Accordingly, adding an object reference 312a to the top of the list may include overwriting an oldest entry in the LRU list 310 with the object references 312a and updating the pointer to reference the location now storing object references 312a. The LRU list 310 may be divided into a hot list 314 and a cold list 316, where the hot list 314 includes the most recent entries including the top most entry. Each of the hot list 314 and cold list 316 may be implemented as separate data structures, e.g. circular buffers or the like. The cold list 316 includes the least recent entries. In some embodiments, the hot list 314 is the top half of the LRU 310. However, other divisions may be used. The hot list 314 may have a number of entries equal to N percent (e.g. 30%, 50%, etc.) of the number of data objects that can be stored in a memory device controlled by the FTL controller. The cold list 316 may have a number of entries equal to (100–N) percent of the number of data objects that can be stored in the memory device controlled by the FTL controller. For example, the hot list 314 may be the top 50 to 30 percent of the LRU list 310 or some other value.

The temperature values calculated for blocks may be stored in temperature storage 318. The temperature storage may store temperature values sorted by value. In the illustrated embodiment, the amount of processing required to sort the temperature values is reduced by assigning blocks to bins 320a-320c that each represent a range of values. For example, bin 320a may include a higher range of values than bin 320b, and so on to a last bin 320c. Any number of bins 320a-320c may be defined. Upon calculating of the temperature for a block it may be assigned to a bin including that temperature in the range of values for that bin. Assigning a block to a bin 320a-320c may include adding a block references 322a-322e uniquely identifying that block to a linked list for that bin. For example, block references 322a, 322b are in a linked list 324a associated with bin 320a and block references 322c-322e are assigned to linked list 324c associated with bin 320c. As is apparent in FIG. 3 a bin 320a-320c may have any number of blocks assigned thereto or may have no blocks assigned thereto.

When performing garbage collection, the block identification module 304 may select blocks from the bin having the lowest range of temperature values that has at least one block assigned thereto. For example, in the illustrated embodiment, blocks corresponding to block references 322c-322e would be selected for garbage collection first before the blocks corresponding to block references 322a-322b.

Figure 4:
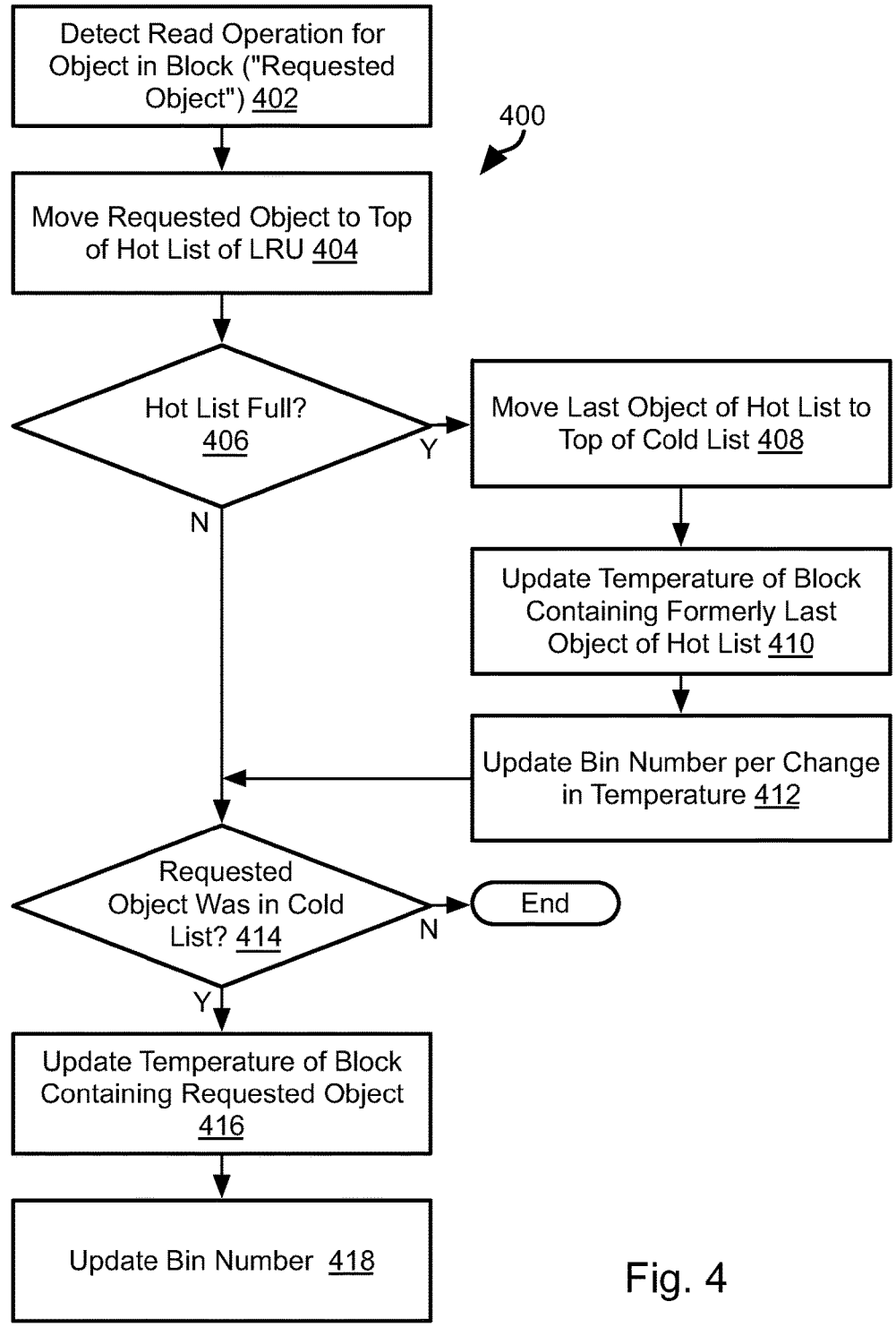
FIG. 4 is a process flow diagram of a method for calculating the temperature of a block in accordance with an embodiment of the present invention.

FIG. 4 illustrates an example method 400 that may be used to calculate the temperature of a block. The method 400 may be executed by the temperature update module 308. The method 400 may include detecting 402 a read operation referencing a data object stored in a block, hereinafter the "requested data object" and "requested block," respectively. In response to the read request, the LRU list 310 is updated 404 by adding a reference to the requested data object at the top of the list.

The method 400 may further include evaluating 406 whether the hot list 314 is full. If so, then the last object of the hot list 314 may be moved 408 to the top of the cold list 316. If the cold list 316 is full, then the last entry in the cold list 316 may be removed or overwritten by the last object from the hot list 314 thereto. In some embodiments, the cold list 316 is not fillable, i.e. the hot list and cold list 314, 316 may have a total number of entries equal to the total number of objects that may be stored in the memory device controlled by the FTL controller 210.

The temperature of the block storing the formerly last object in the hot list 314 may then be updated 410. If the change in temperature means that the temperature corresponds to a different bin 320a-320c, then the bin number of the block is updated 412 to refer to the bin 320a-320c having a range including the new temperature of the block storing the formerly last object.

In either case of the evaluation 406, the method 400 may include evaluating 414 whether the requested object was in the cold list 316. If not, then the method 400 may end inasmuch as moving the requested object to the top of the host list 314 will not change its temperature as described in greater detail below. If so, then the temperature of the requested block is updated 416 and the bin number of the requested block is updated 418 to refer to the bin 320a-320c having a corresponding range including the updated 416 temperature of the requested block.

requested data object was previously in the cold list 316 of the LRU list 310. If not, then the method 400 ends. If so, then the temperature of the requested block is updated 408. A reference to the requested block is then added 410 to a bin including the updated temperature value in the value range assigned thereto. In some embodiments, metadata of each data object may store its position in the LRU list 310, e.g.

a flag may be included in the metadata of each data object that is set when the object is in the cold list of the LRU list 310.

In some embodiments, the temperature of a block is determined according to a function that increases with a number of valid objects in a block and with a recency with which the data objects in the block have been read.

For example the temperature T of a block may be calculated as T=V*R, where V is a metric of a number of valid data objects stored in the block and R is a metric of the recency with which the data objects stored in the block have been accessed.

In some embodiments, V and R are calculated as:

$V$=(number of valid objects in the block)/(total number of objects in the block)

$R$=(number of valid objects stored in the block and in hot list of the LRU list)/(number of valid objects in the block)

FIG. 4 illustrates that the temperature of a block is updated in response to a read request for a data object stored in the block that is in the cold list 316 of the LRU list 310. In some embodiments, the temperature of a block is also updated in response to receiving, by FTL controller 210, a delete requests referencing a data object stored in the block. Inasmuch as both V and R are a function of the number of valid objects in the block, the temperature will likely change as a result of a data object being deleted, i.e. invalidated.

In some embodiments, write operations are constrained to be equal to the size an entire block. Accordingly, upon completion of writing to a block ("the written block"), all of the data objects stored in the written block are valid, so the value of V is 1. Likewise, immediately after the write operation, all of the objects in the written block will also be added at the top of hot list 314 since they have just been the subject of an I/O operation. Accordingly, the written block will have an R value at or near 1, since either all of the data objects will be in the hot list 314 or the hot list 314 will be completely occupied by data objects of the written block. Upon writing of data to the written block, the temperature of the block may then be updated. As noted above, the temperature will be at or near 1 since the V value is 1 and the R value is also at or near 1. Likewise, the method 400 may include updating the temperature of blocks containing objects displaced from the hot list 314 due to the addition of the data objects written to the written block as described above with respect to steps 408-412.

Figure 5:
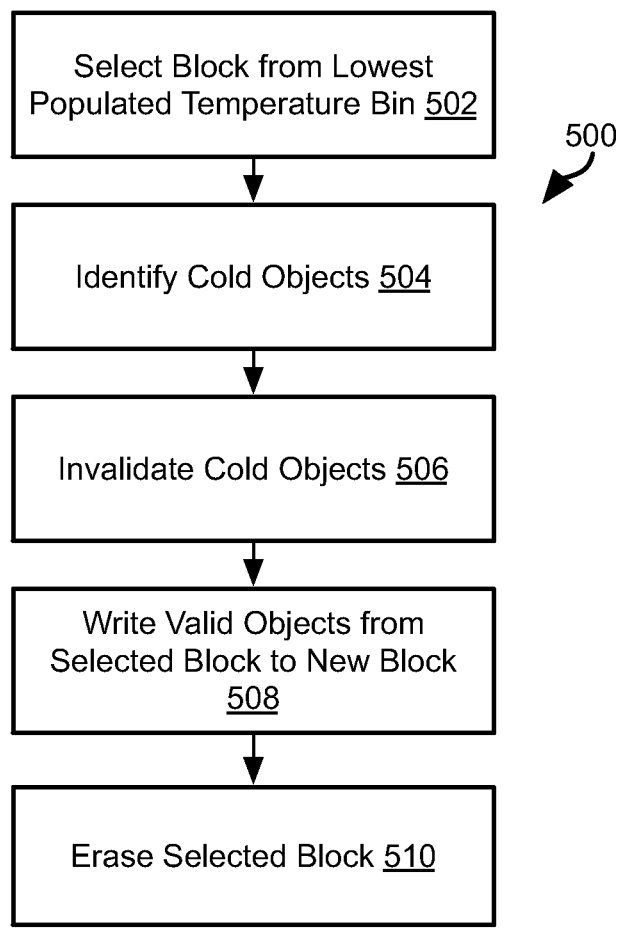
FIG. 5 is a process flow diagram of a method for performing garbage collection in accordance with an embodiment of the present invention.

Referring to FIG. 5, garbage collection may be performed according to the illustrated method 500. The method 500 may be executed by the FTL controller 210. The method 500 may include selecting a block from a lowest populated bin 320a-320c in temperature storage 318. For example, in the example of FIG. 3, any of blocks 322c-322e may be selected. The method 500 may include selecting 502 the oldest block references 322e in the linked list for the lowest populated bin 320a-320c or the most recently added block reference 322c.

As noted above, implementing the bins 320a-320c does not require strict sorting. However, in some embodiments, objects may be sorted by temperature, such that the block having the lowest temperature is selected. In the illustrated embodiment, the block selected at step 502 may not be have the lowest temperature but will have a lower temperature than all other blocks associated with other bins 320a-320b inasmuch as it has the lowest range of values associated therewith out of all bins that have block references 322a-322e assigned thereto.

The method 500 may further include identifying "cold" data objects in the selected block. Specifically, any data objects stored in the selected block that are not in the hot list 314 of the LRU list 310 may be identified 504 as cold and invalidated 506. In some embodiments, another criteria is used. For example, the position in the list below which objects are considered bold may be different than the division between the hot list 314 and cold list 316 for purposes of computing the temperature of a block, i.e. it could be lower or higher in the LRU list 310 than the top of the cold list 316.

Those data objects in the selected block that are still valid after the invalidating step 506 are then written 508 to a new block and the selected block is erased 510. Inasmuch as some of the previously-valid data objects are invalidated at step 506, the amount of memory required to receive the valid data objects is reduced, which reduces write amplification. Since the data invalidated at step 506 is cold, invalidating them does not significantly impact user access hit rate.

The present invention may be embodied in other specific forms without departing from its spirit or essential characteristics. The described embodiments are to be considered in all respects only as illustrative, and not restrictive. In particular, although the methods are described with respect to a NAND flash SSD, other SSD devices or non-volatile storage devices such as hard disk drives may also benefit from the methods disclosed herein. The scope of the invention is, therefore, indicated by the appended claims, rather than by the foregoing description. All changes which come within the meaning and range of equivalency of the claims are to be embraced within their scope.

What is claimed is:

1. A method comprising:

executing, by a memory device controller, a plurality of read operations a plurality of blocks of memory, each block of the plurality of blocks of memory storing one or more data objects, each read operation referencing one of the data objects in one of the blocks of the plurality of memory;

invalidating, by the memory device controller, a portion of the one or more data objects in the one or more blocks of memory in response to detecting the portion of the one or more data objects meeting an invalidation criteria;

calculating, by the memory device controller, for each block of the plurality of blocks of memory, a recency metric that increases with a recency with which the one or more objects of the each block have been read;

calculating, by the memory device controller, for each block of the plurality of blocks of memory, a validity metric that increases with a proportion of valid to invalid objects of the one or more objects of the each block;

identifying, by the memory device controller, one or more lowest metric blocks from the plurality of blocks of memory, the one or more lowest metric blocks each having a combined recency metric and validity metric that is lower than a remainder of the plurality of blocks of memory not included in the lowest metric blocks; and performing, by the memory device controller, garbage collection on the one or more lowest metric blocks prior to performing garbage collection on the remainder of the plurality of blocks of memory.

2. The method of claim 1, further comprising:

inserting, by the memory device controller, for each read operation of the plurality of read operations, an entry at a top of a hot list, the entry referencing the one of the data objects in the one of the blocks of the plurality of memory referenced by the each read operation;

wherein calculating the recency metric for each block of the plurality of blocks of memory comprises calculating a ratio of a number of the one or more objects of the each block that are both valid and in a hot list to a number of the one or more objects of the each block that are valid.

3. The method of claim 2, wherein performing garbage collection on the one or more lowest metric blocks further comprises:

invalidating for each block of the lowest metric blocks any objects of the one or more objects of the each block that are not in the hot list.

4. The method of claim 3, wherein the hot list is a top half of a least recently used (LRU) list.

5. The method of claim 2, further comprising:

wherein calculating the validity metric for each block of the plurality of blocks of memory comprises calculating a ratio of a number of the one or more objects of the each block that are both valid and in the hot list to a number of the one or more objects of the each block that are valid.

6. The method of claim 5, wherein identifying the one or more lowest metric blocks from the plurality of blocks of memory, the one or more lowest metric blocks each having the combined recency metric and validity metric that is lower than the remainder of the plurality of blocks of memory not included in the lowest metric blocks further comprises calculating the combined recency metric and validity metric as a product of the recency metric and validity metric.

7. The method of claim 6, further comprising:

for each block of the plurality of blocks of memory:
calculating, by the memory device controller, the combined recency metric and validity metric of the each block; and
assigning the each block to a bin of a plurality of bins according to the combined recency metric and validity metric thereof, the bin of the plurality of bins having a range of values associated therewith that includes the combined recency metric and validity metric of the each block;

wherein identifying the lowest metric blocks comprises identifying a bin of the plurality of bins having a lowest range of values associated therewith as compared to other bins of the plurality of bins and that has at least one block of the plurality of blocks assigned thereto.

8. The method of claim 7, wherein assigning the each block to the bin of the plurality of bins comprises adding a reference to the each block to a linked list associated with the bin.

9. The method of claim 7, further comprising calculating the combined recency metric and validity metric of the each block in response to a data object of the one or more data objects of the each block that is not in the hot list being read.

10. The method of claim 9, further comprising, for each read operation:

(a) calculating updated combined recency metric and validity metric for any block of the plurality of blocks of memory displaced from the hot list in response to inserting the entry referencing the one of the data objects in the one of the blocks of the plurality of memory referenced by the each read operation; and (b) assigning to a bin of the plurality of bins corresponding to the updated combined recency metric and validity metric any block of the plurality of blocks of memory displaced from the hot list in response to inserting the entry referencing the one of the data objects in the one of the blocks of the plurality of memory referenced by the each read operation.

11. An apparatus comprising:

a storage device including a non-volatile storage medium defining a plurality of blocks of memory; and a memory controller device programmed to:
write a plurality of data objects to a plurality of blocks of memory in response to write instructions received from a host system;
execute read instructions from a host system, each read instruction referencing a requested block of the plurality of blocks of memory and a requested data object stored in the requested block by, for each read instruction—
retrieving the requested data object from the requested block and returning the requested block to the host system;
updating a temperature for the requested block, the temperature being a function that increases with a number of valid data objects are included in a portion of the plurality of data objects stored in the requested block and that increases with recency with which the portion of the plurality of data objects stored in the requested block have been read;
if an invalidation criteria is met with respect to one or more data objects of the plurality of data objects, invalidate the one or more data objects;
perform garbage collection with respect to the plurality of blocks of memory by—
identifying one or more lowest temperature blocks from the plurality of blocks of memory, the temperatures for the lowest temperature blocks being lower than a remainder of the plurality of blocks of memory not including the lowest temperature blocks;
moving any valid data objects of the plurality of data objects stored in the lowest temperature blocks to other blocks of the plurality of blocks of memory;
erasing the one or more lowest temperature blocks.

12. The apparatus of claim 11, wherein the memory controller is further programmed to update the temperature for the requested block by calculating a validity metric that is a ratio of (a) a number of the portion of the plurality of data objects stored in the requested block that are valid to (b) a number data objects in the portion of the plurality of data objects stored in the requested block, the function increasing with increasing of the validity metric.

13. The apparatus of claim 12, wherein the memory controller is further programmed to:

execute the read instructions by, for each read instruction, making an entry at a top of a hot list, the entry referencing the requested data block;

update the temperature of the requested block by calculating a recency metric as a ratio of (a) a number of the portion of the plurality of data objects stored in the requested block that are valid and in the hot list to (b) a number of data objects in the portion of the plurality of data objects stored in the requested block that are valid, the function increasing with increasing of the recency metric.

14. The apparatus of claim 13, wherein the hot list is a top half of a least recently used (LRU) list.

15. The method of claim 13, further comprising:
wherein the memory controller is further programmed to calculate the temperature of the requested block as a product of the validity metric and the recency metric.

16. The apparatus of claim 13, wherein the memory controller is further programmed to performing garbage collection by:
invalidating any data objects of the plurality of data objects stored in the lowest temperature blocks that are not in the hot list prior to moving the any valid data objects of the plurality of data objects stored in the lowest temperature blocks to the other blocks of the plurality of blocks of memory.

17. The apparatus of claim 13, wherein the memory controller is further programmed to:
execute the read instructions by, for each read instruction:
assigning the requested block to a bin of a plurality of bins according to the temperature thereof, the bin of the plurality of bins having a range of values associated therewith that includes the temperature of the requested block;
wherein the memory controller is further programmed to identify the one or more lowest temperature blocks by identifying a bin of the plurality of bins having a lowest range of values associated therewith as compared to other bins of the plurality of bins and that has at least one block of the plurality of blocks of memory assigned thereto.

18. The apparatus of claim 17, wherein the memory controller is further programmed to assign the requested block to the bin of the plurality of bins comprises adding a reference to the requested block to a linked list associated with the bin.

19. The apparatus of claim 13, wherein the memory controller is further programmed to execute the read instructions by, for each read instruction:
if the requested data object was in the hot list prior to receiving the each read instruction, refraining from updating the temperature of the requested block; and
if the requested data object was not in the hot list prior to receiving the each read instruction, updating the temperature of the requested block.

20. The apparatus of claim 19, wherein the memory controller is further programmed to, for each read instruction:
identify a displaced object that is displaced from the hot list due to making the entry at the top of a hot list;
calculating an updated temperature of a block of the plurality of blocks of memory storing the displaced object; and
assign the block of the plurality of blocks of memory storing the displaced object to a bin of the plurality of bins having a range of values including the updated temperature.

* * * * *